(12) United States Patent
Abd Elhamid et al.

(10) Patent No.: US 8,455,155 B2
(45) Date of Patent: Jun. 4, 2013

(54) INEXPENSIVE APPROACH FOR COATING BIPOLAR PLATES FOR PEM FUEL CELLS

(75) Inventors: Mahmoud H. Abd Elhamid, Grosse Pointe Woods, MI (US); Youssef M. Mikhail, Sterling Heights, MI (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1978 days.

(21) Appl. No.: 11/562,597

(22) Filed: Nov. 22, 2006

(65) Prior Publication Data

US 2008/0138687 A1    Jun. 12, 2008

(51) Int. Cl.
*H01M 8/24* (2006.01)

(52) U.S. Cl.
USPC .......................................... 429/514

(58) Field of Classification Search
USPC .......................................... 429/514
See application file for complete search history.

(56) References Cited

U.S. PATENT DOCUMENTS

| | | | |
|---|---|---|---|
| 4,197,178 A | 4/1980 | Pellegri |
| 4,510,219 A | 4/1985 | Rowlette |
| 4,519,065 A | 5/1985 | Lewis et al. |
| 4,542,082 A | 9/1985 | Rowlette |
| 4,547,443 A | 10/1985 | Rowlette et al. |
| 4,625,395 A | 12/1986 | Rowlette |
| 4,658,499 A | 4/1987 | Rowlette |
| 4,973,358 A | 11/1990 | Jin et al. |
| 5,017,446 A | 5/1991 | Reichman et al. |
| 5,036,252 A | 7/1991 | Lob |
| 5,086,035 A | 2/1992 | Hung et al. |
| 5,236,687 A | 8/1993 | Fukuda et al. |
| 5,272,017 A | 12/1993 | Swathirajan et al. |
| 5,554,178 A | 9/1996 | Dahl et al. |
| 5,567,500 A | 10/1996 | Marshall et al. |
| 5,578,388 A | 11/1996 | Faita et al. |
| 5,624,769 A | 4/1997 | Li et al. |
| 5,726,524 A | 3/1998 | Debe et al. |
| 5,728,283 A | 3/1998 | Reuter et al. |
| 5,776,624 A | 7/1998 | Neutzler |
| 5,786,068 A | 7/1998 | Dorfman et al. |
| 5,798,188 A | 8/1998 | Mukohyama et al. |
| 5,863,671 A | 1/1999 | Spear, Jr. et al. |
| 5,888,593 A | 3/1999 | Petrmichl |
| 5,952,118 A | 9/1999 | Ledjeff et al. |
| 6,051,117 A | 4/2000 | Novak et al. |

(Continued)

FOREIGN PATENT DOCUMENTS

| | | |
|---|---|---|
| EP | 1009051 | 6/2000 |
| EP | 1035608 | 9/2000 |

(Continued)

*Primary Examiner* — Ula C Ruddock
*Assistant Examiner* — Lisa S Park Gehrke
(74) *Attorney, Agent, or Firm* — Brooks Kushman P.C.

(57) ABSTRACT

A metallic bipolar plate for use in a fuel cell includes a metallic bipolar plate having one or more channels and a contact surface. The contact surface has a surface roughness defined by a plurality of peaks and valleys wherein at least a portion of the valleys are filled with an electrically conductive material. The contact surface is adapted to contact the anode diffusion layer or the cathode diffusion layer such that the contact resistance occurring at this surface is lower than when the electrically conductive material is not present. A fuel cell incorporating the metallic bipolar plate is also provided.

19 Claims, 6 Drawing Sheets

U.S. PATENT DOCUMENTS

| | | | |
|---|---|---|---|
| 6,057,054 | A | 5/2000 | Barton et al. |
| 6,096,450 | A | 8/2000 | Walsh |
| 6,099,984 | A | 8/2000 | Rock |
| 6,103,413 | A | 8/2000 | Hinton |
| 6,218,089 | B1 | 4/2001 | Pierrat |
| 6,248,467 | B1 | 6/2001 | Wilson |
| RE37,284 | E | 7/2001 | Li et al. |
| 6,309,773 | B1 | 10/2001 | Rock |
| 6,335,120 | B1 | 1/2002 | Bernard et al. |
| 6,350,539 | B1 | 2/2002 | Wood et al. |
| 6,358,642 | B1 | 3/2002 | Griffith et al. |
| 6,372,376 | B1 | 4/2002 | Fronk et al. |
| 6,379,476 | B1 * | 4/2002 | Tarutani et al. ............ 148/325 |
| 6,379,795 | B1 | 4/2002 | Bisaria et al. |
| 6,426,863 | B1 | 7/2002 | Munski |
| 6,503,653 | B2 | 1/2003 | Rock |
| 6,511,766 | B1 | 1/2003 | Loutfy |
| 6,562,507 | B1 | 5/2003 | Cisar et al. |
| 6,607,857 | B2 | 8/2003 | Blunk et al. |
| 6,649,030 | B1 | 11/2003 | Tesar |
| 6,811,918 | B2 | 11/2004 | Blunk et al. |
| 6,827,747 | B2 | 12/2004 | Lisi et al. |
| 6,866,958 | B2 | 3/2005 | Vyas et al. |
| 6,887,610 | B2 | 5/2005 | Elhamid et al. |
| 6,942,941 | B2 | 9/2005 | Blunk et al. |
| 7,157,178 | B2 | 1/2007 | Mathias et al. |
| 7,318,974 | B2 | 1/2008 | Ohara et al. |
| 2002/0039675 | A1 | 4/2002 | Braun et al. |
| 2002/0081478 | A1 | 6/2002 | Busenbender |
| 2002/0086197 | A1 | 7/2002 | Breuer et al. |
| 2003/0003345 | A1 | 1/2003 | Ohara et al. |
| 2003/0228512 | A1 * | 12/2003 | Vyas et al. ............ 429/38 |
| 2004/0058210 | A1 | 3/2004 | Elhamid et al. |
| 2004/0062974 | A1 | 4/2004 | Abd Elhamid et al. |
| 2004/0091768 | A1 | 5/2004 | Abd Elhamid et al. |
| 2005/0037935 | A1 | 2/2005 | Abd Elhamid et al. |
| 2005/0100771 | A1 | 5/2005 | Vyas et al. |
| 2005/0112449 | A1 | 5/2005 | Mathias et al. |
| 2005/0244700 | A1 | 11/2005 | Elhamid et al. |

FOREIGN PATENT DOCUMENTS

| | | | |
|---|---|---|---|
| EP | | 1284521 | 2/2003 |
| KR | | 2005122452 A | * 12/2005 |
| WO | WO 96/37005 | | 11/1996 |

* cited by examiner

INEXPENSIVE APPROACH FOR COATING BIPOLAR PLATES FOR PEM FUEL CELLS

BACKGROUND OF THE INVENTION

1. Field of the Invention

In at least one embodiment, the present invention is related to bipolar plates used in PEM fuel cells.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, these metallic plates typically include a passive oxide film on their surfaces requiring electrically conductive coatings to minimize the contact resistance. Such electrically conductive coatings include gold and polymeric carbon coatings. Typically, these coatings require expensive equipment that adds to the cost of the finished bipolar plate.

Accordingly, there is a need for improved methodology for lowering the contact resistance at the surfaces of bipolar plates used in fuel cell applications.

SUMMARY OF THE INVENTION

The present invention overcomes the problems encountered in the prior art by providing in at least one embodiment, a metallic bipolar plate for use in a fuel cell having an anode diffusion layer, an anode, a cathode, and a cathode diffusion layer. The metallic bipolar plate of this embodiment includes a metal plate having a first and second surface. At least one of the first and second surfaces defines one or more channels and a contact surface. The contact surface has a surface roughness defined by a plurality of peaks and valleys wherein at least a portion of the valleys are filled with an electrically conductive material. The contact surface is adapted to contact the anode diffusion layer or the cathode diffusion layer such that the contact resistance occurring at this surface is lower than when the electrically conductive material is not present. Advantageously, the electrically conductive material is provided from carbon derived, for example, from graphite or from a microporous layer.

DETAILED DESCRIPTION OF THE PREFERRED EMBODIMENT(S)

Figure 1:
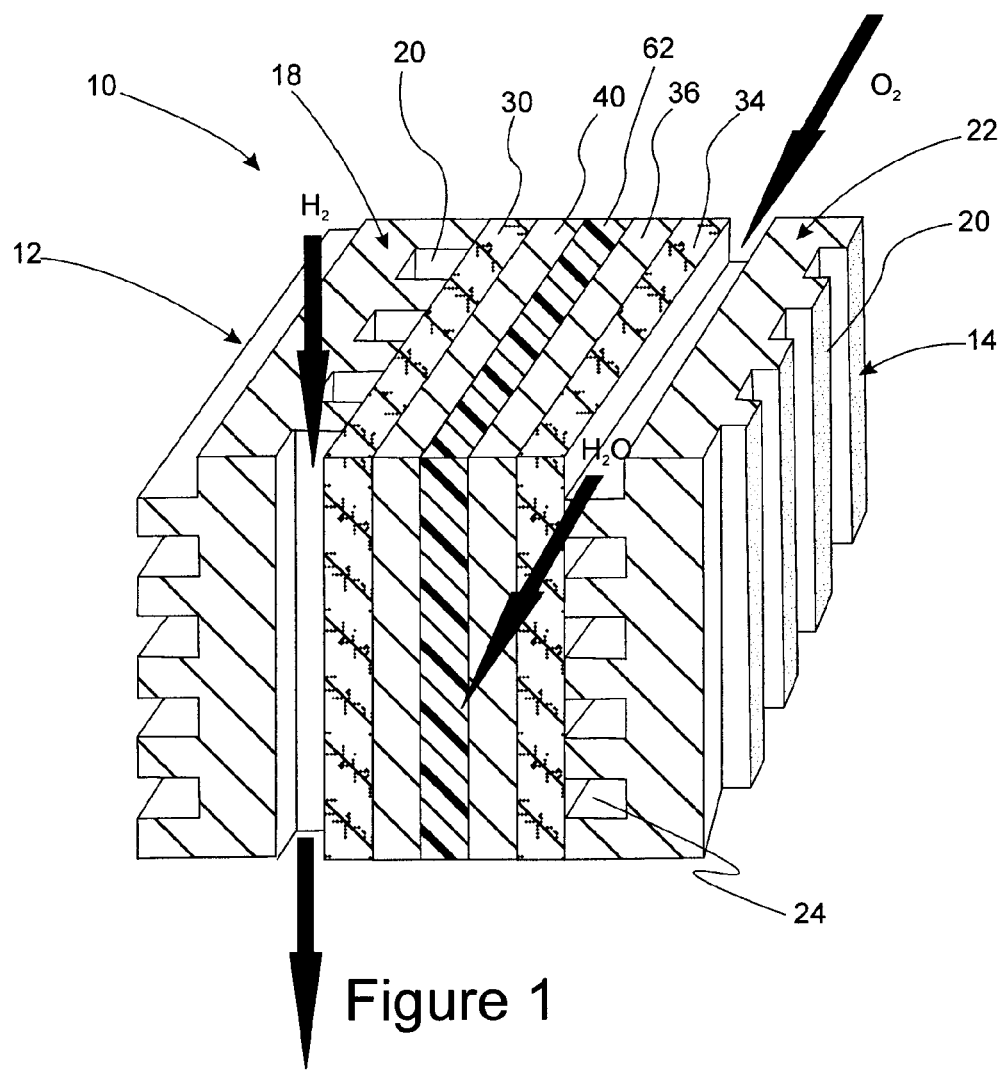
FIG. 1 is a perspective view of a fuel cell incorporating the electrocatalyst of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The terms "roughness average" or "surface roughness average" are used herein means arithmetic average of the absolute values of the profile height deviations. The roughness average may be determined in accordance with ANSI B46.1. The entire disclosure of this reference is hereby incorporated by reference.

With reference to FIG. 1, a perspective view of a fuel cell incorporating the bipolar plates of the present embodiment is provided. PEM fuel cell 10 includes bipolar plates 12, 14 of an embodiment of the present invention. Within bipolar plate 12, anode flow field 18 includes one or more channels 20 for introducing a first gas to the fuel cell 10. Similarly, bipolar plate 14 includes cathode gas flow field 22 which includes one or more channels 24 for introducing a second gas into fuel cell 10. Typically, the first gas includes a fuel such as hydrogen while the second gas includes an oxidant such as oxygen. Anode diffusion layer 30 is positioned between anode flow field 18 and anode layer 32 while cathode diffusion layer 34 is positioned between cathode flow field 22 and cathode layer 36. Polymeric ion conductive membrane 40 is interposed between anode layer 32 and cathode layer 36.

Figure 2:
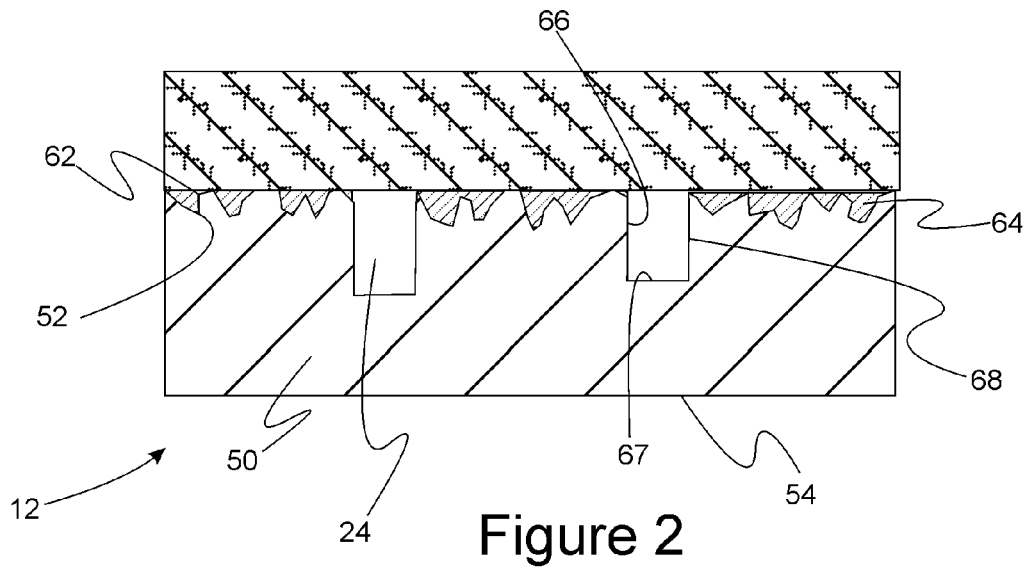
FIG. 2 is a schematic illustration of an embodiment of the bipolar plates of the invention in which the conductive material is derived from an electrically conductive powder.

With reference to FIG. 2, a schematic illustration of a variation of the bipolar plates of the invention that uses electrically conductive particles as the conductive material is provided. Bipolar plate 12 includes metal plate 50, which has first surface 52 and second surface 54. At least one of first surface 52 or second surface 54 defines one or more channels 24, 60 and contact surface 62. Metal plate 50 is formed from virtually any electrically conductive plates. Examples of useful materials for metal plate 50 include, but are not limited to, stainless steels, nickel-based alloys, titanium, nickel, and combinations thereof. Contact surface 62 is characterized by a surface roughness defined by a plurality of peaks and valleys wherein at least a portion of the valleys are filled with an electrically conductive material 64. In a refinement of the present variation, the surface roughness average from about 0.25 microns to about 0.5 microns. Finally, contact surface 62 is adapted to contact a gas diffusion layer such as an anode diffusion layer or the cathode diffusion layer. It should also be appreciated that sides 66, 67, 68 may also have a roughened surface. In such refinements, the roughened surfaces of sides 66, 67, 68 may assist in the application of hydrophilic coatings (e.g., NanoX) to these surfaces.

Still referring to FIG. 2, the electrically conductive material in this variation comprises electrically conductive particles. Suitable conductive particles typically include carbon and, in particular, graphite. In a further refinement of this variation, the conductive material is present in an amount of 0.01 mg/cm$^2$ to 0.4 mg/cm$^2$ (this is the amount per unit of surface area of first surface 52 or second surface 54). In another refinement of this variation, the conductive material is present in an amount of 0.05 mg/cm$^2$ to 0.3 mg/cm$^2$. In yet another refinement of this variation, the conductive material is present in an amount of 0.1 mg/cm$^2$ to 0.2 mg/cm$^2$. In still another refinement of this variation, the conductive material is present in an amount of 0.15 mg/cm$^2$.

Figure 3:
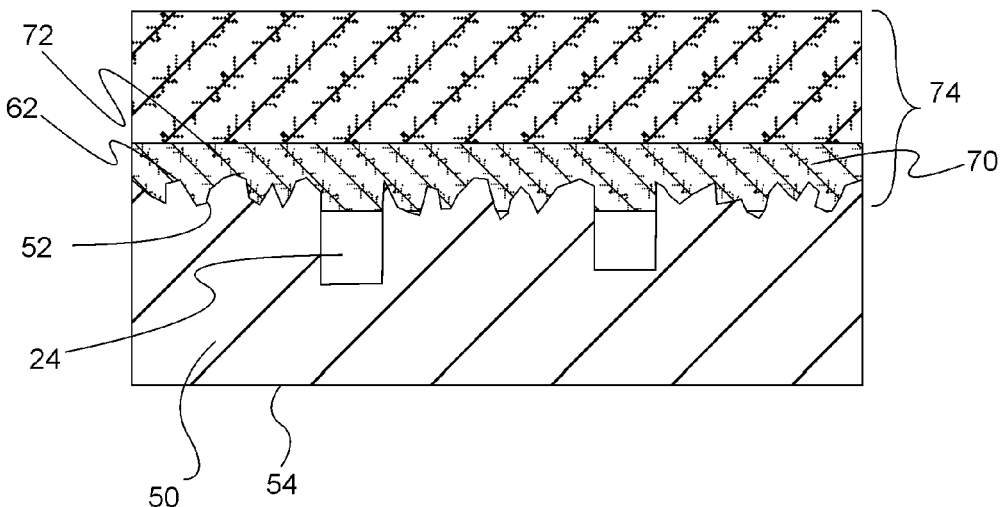
FIG. 3 is a schematic illustration of a variation of the bipolar plates of the invention in which the conductive material is derived from a microporous layer.

With reference to FIG. 3, a schematic illustration of a variation of the bipolar plates of the invention in which the conductive material is provided from a microporous layer is provided. Bipolar plate 12 includes metal plate 50, which has first surface 52 and second surface 54. At least one of first surface 52 or second surface 54 defines one or more channels 24 and contact surface 62. Contact surface 62 is characterized by a surface roughness defined by a plurality of peaks and valleys wherein at least a portion of the valleys are filled with an electrically conductive material 70 which is derived from microporous layer 72. In a refinement of the present variation, the surface roughness averages from about 0.25 microns to about 0.5 microns. In another refinement of the present variation, microporous layer 72 is part of gas diffusion layer 74. Usually, fuels utilize a gas diffusion layer in which the microporous layer faces and contacts the ion conducting layer. In the present variation, the microporous layer contacts bipolar plate 12 and contact surface 62. Typically, the porous and resilient nature of microporous layer 72 allows for at least a portion of the valleys in contact surface 72 to be filled with conductive material from microporous layer 72. Finally, contact surface 62 is adapted to contact a gas diffusion layer such as an anode diffusion layer or the cathode diffusion layer. An example of a useful microporous layer is provided in U.S. patent application Ser. No. 10/925,853, the entire disclosure of which is hereby incorporated by reference.

In another embodiment of the present invention, the bipolar plates of FIGS. 2 and 3 are combined. Specifically, in this embodiment, the bipolar plate 12 is roughened as in FIG. 2 with electrically conductive particle filling at least a portion of the valleys. In this embodiment, a microporous layer is contacted to the roughened surface as described above in connection to the description of FIG. 3.

Each of the embodiments, variations, and refinements of the present invention are characterized by a contact resistance present when the bipolar plates are incorporated in a fuel cell. In one variation, the contact resistance less than about 300 mohm-cm$^2$ when contacted to a gas diffusion layer at a compression pressure of 200 psi. In this context, the compression pressure is the average pressure with which the bipolar plate contacts the gas diffusion pressure. In another variation, the contact resistance less than about 50 mohm-cm$^2$ when contacted to a gas diffusion layer with a compression pressure of 200 psi. In still another variation, the contact resistance from about 10 mohm cm$^2$ to 100 mohm cm$^2$ when contacted to an anode diffusion layer with a compression pressure of 200 psi.

Figure 4:
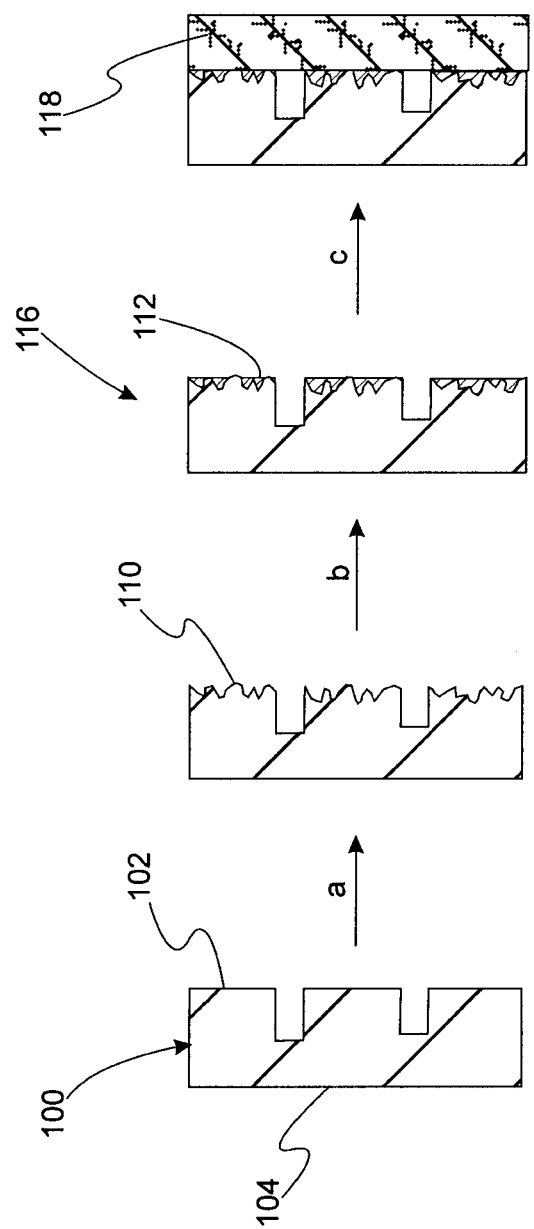
FIG. 4 is a flowchart illustrating an embodiment for making the bipolar plates of FIG. 2.
Figure 5:
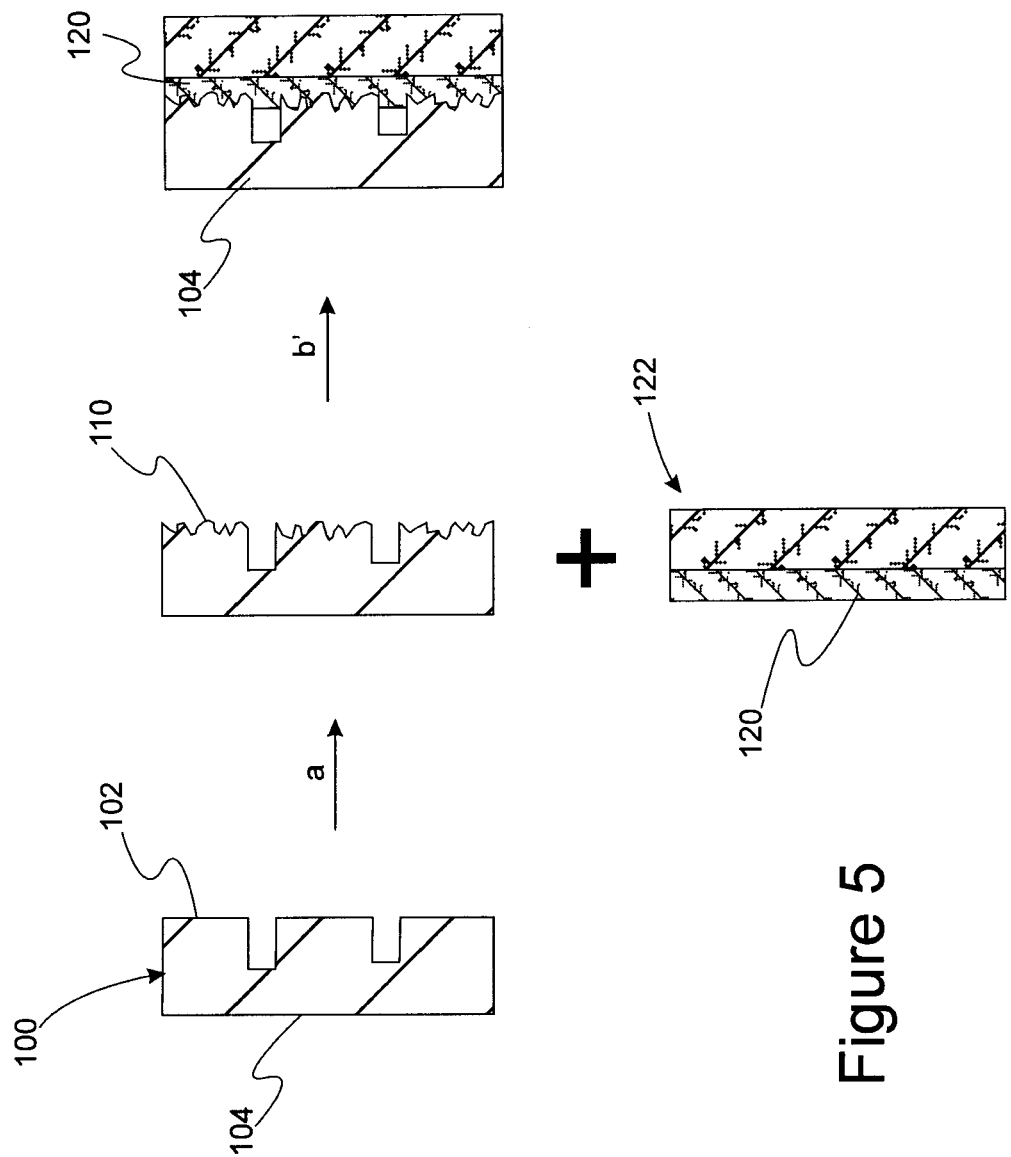
FIG. 5 is a flowchart illustrating an embodiment for making the bipolar plates of FIG. 3.

In another embodiment of the present invention, a method of forming the bipolar plates set forth above is provided. With reference to FIGS. 4 and 5, a flow chart illustrating the method of the invention is provided. Metal plate 100 includes first surface 102 and second surface 104. Metal plate 100 further includes channels 102, 104 already formed therein and defined by first surface 102 and second surface 104. At least a portion of first surface 102 is roughened in step a) to form first roughened surface 110. In general, the surface roughness in the bipolar plates is formed by roughening the metal surface using mechanical, physical, chemical or electrochemical methods. Specific examples of such methods include, but are not limited to, mechanical polishing or abrasion, exposure to a moderate water jet, ion beam modifications, laser ablation, chemical etching, and combinations thereof. In step b), at least a portion of roughened surface 110 is coated with conductive material 112 such that at least a portion of the valleys in the first roughened surface are filled with the electrically conductive material to form bipolar plate 116. FIG. 4 depicts a variation in which conductive material is provided as conductive particles as described above in connection with the description of FIG. 2. Subsequently, bipolar plate 116 is integrated in a fuel cell by contacting bipolar plate 116 with an adjacent layer such as diffusion layer 118. In one variation of the present embodiment, metal plate 100 is roughed abrasively in one direction (i.e., the material doing the abrasion is moving in a first direction) with graphite scrubbed against the polished surface in a perpendicular direction to obtain a low contact resistance as set forth above.

FIG. 5 depicts a variation in which conductive material is provided from a microporous layer as set forth above in connection with the description of FIG. 3. In this variation, first roughened surface 110 is contacted with microporous layer 120, which is part of diffusion layer 122. Due to the compressibility of microporous layer 120, at least a portion of the valleys in roughed surface 110 are filled with conductive material which is part of and/or derived from microporous layer 120.

The following examples illustrate the various embodiments of the present invention. Those skilled in the art will recognize many variations that are within the spirit of the present invention and scope of the claims.

Figure 6:
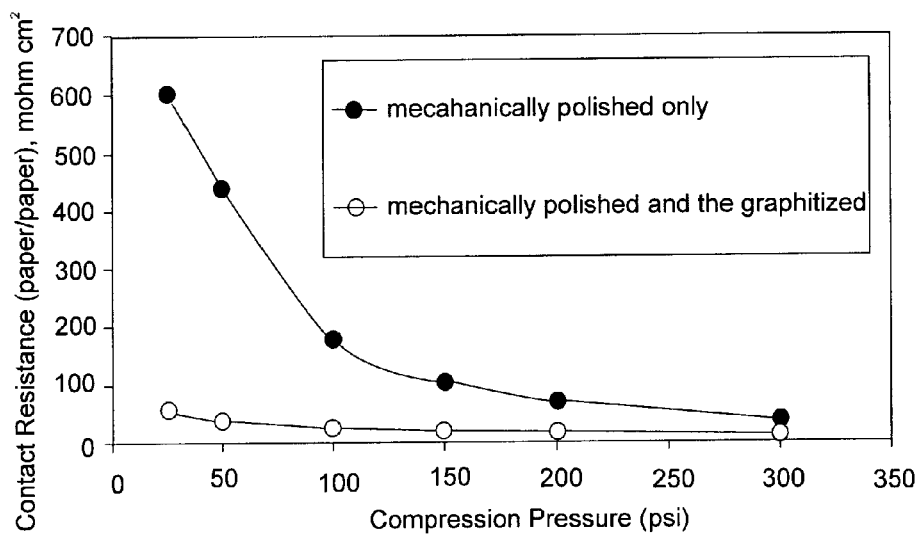
FIG. 6 provides plots of the contact resistance versus compression pressure for roughened 304L SS coupons graphitized in accordance with an embodiment of the invention and contacting a gas diffusion layer.

Several 304L SS coupons that are polished using a 280 grit SiC paper and then mechanically coated with graphite. The contact resistance values obtained on the SS surface before and after applying the graphite layer are shown in FIG. 6. FIG. 6 provides plots of the contact resistance versus compression pressure for these coupons when contacting a gas diffusion layer. The compression pressure is the pressure with which the coupons contact the gas diffusion layer. FIG. 6 shows that the mechanically applied graphite coating has reduce the contact resistance on the stainless steel surface significantly to below 20 mohm cm$^2$ at 200 psi. The latter is below the target for conductive coatings to be used as bipolar plate for PEM fuel cells.

In another set of experiments, two LANL 316L SS plates are polished with a 280 grit SiC paper and then mechanically coated with graphite by scratching the rough surface against a graphite disk. Table 1 shows the contact resistance measured plate to plate "translates to paper to paper with regular CR measurements". These values show that the mechanically coated graphite has significantly reduced the contact resistance on the stainless steel surface and allows it to be used inside PEM fuel cells. The decrease in the contact resistance is attributed to the synergism between the roughness induced by the mechanically polishing stainless steel surface and the ductility of graphite, which allows it to cover the surface and the valleys with graphite on the roughened stainless steel surface.

Table 1 values of the plate to plate resistance obtained on 316L ss LANL plates coated with the mechanical graphite coating

| Compression pressure, psi | Contact resistance measured plate to plate across the paper "equivalent to normal paper to paper measurements" |
|---|---|
| 25 | 47 |
| 50 | 35 |
| 100 | 25 |
| 150 | 20.4 |
| 200 | 17.5 |
| 300 | 14 |

Figure 7:
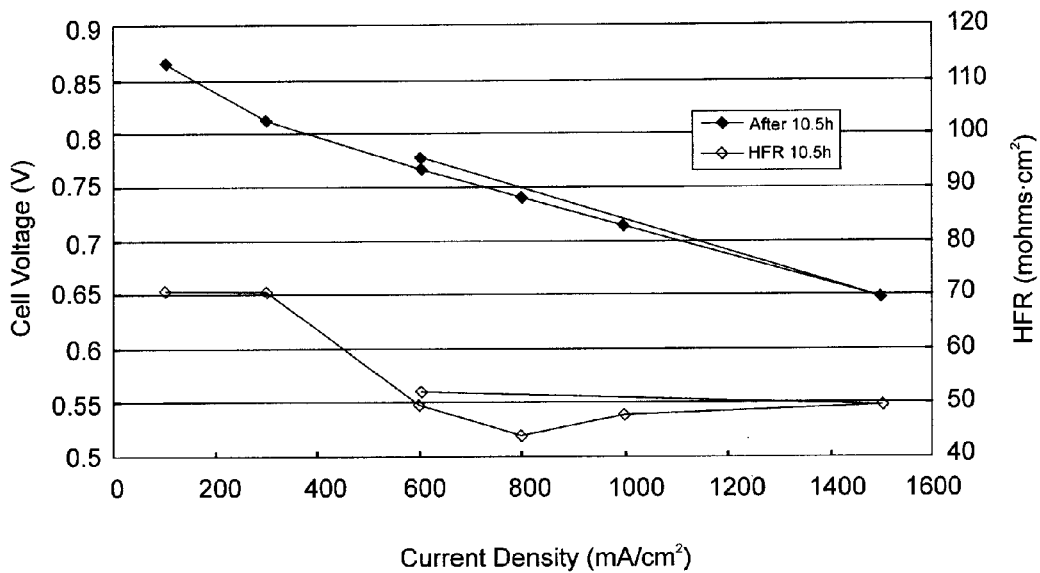
FIG. 7 provides fuel cell voltage and high frequency resistance for graphitized roughened stainless steel coupons contacting a gas diffusion layer.

The coated LANL plates are tested in a single fuel cell and under wet/dry cyclic conditions "40/100 RH gas inlet" at 80° C. FIG. 7 provides a polarization curve for this configuration. FIG. 7 shows a total cell resistance of 50-65 mohm cm$^2$ and high current densities for these samples. These values are comparable to resistances obtained for gold coated stainless steel or Poco graphite plates. Moreover, this experimental cell is run for at least 150 hours without apparent change in cell resistance and/or performance.

Titanium coupons are also treated in an analogous manner. Passivated titanium coupons treated as above exhibit a contact resistance of 350 mohm-cm$^2$ when contacted to a gas diffusion layer. The mechanically coated graphite on the same titanium coupons show significant reduction in the contact resistance. For example, the contact resistance for such samples is less than 20 mohm cm$^2$ at 200 psi. This can be used to develop hydrophilic coatings based on porous titanium oxide films inside the channels of bipolar plates, and mechanically coated graphite on the lands of the plates to reduce contact resistance while maintaining the hydrophilicity of the titanium oxide inside the channels.

Figure 8:
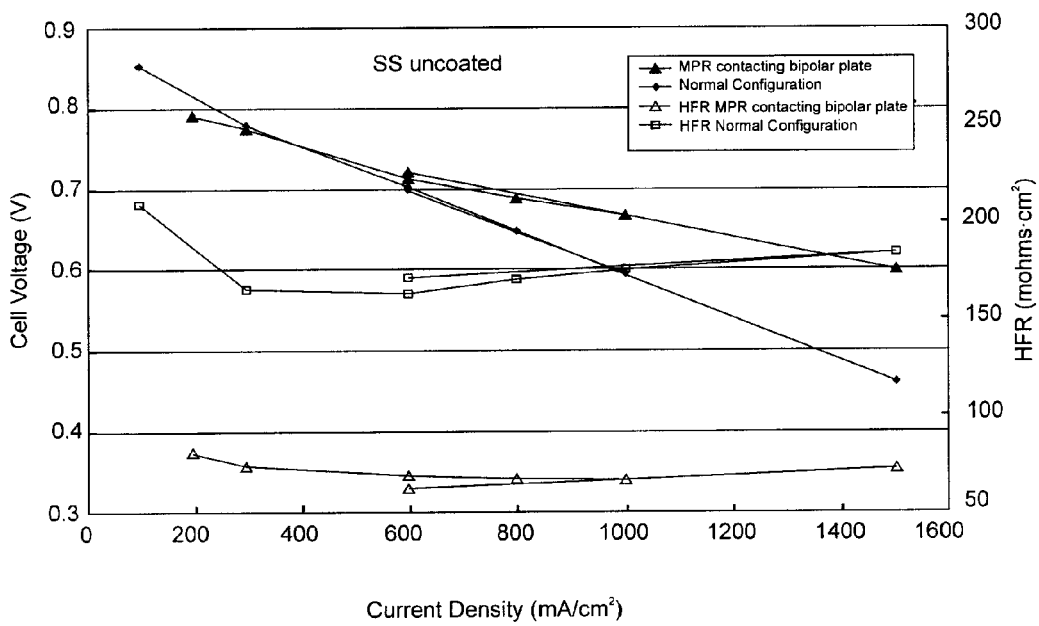
FIG. 8 provides fuel cell voltage and high frequency resistance for roughened stainless steel coupons contacting a gas diffusion layer having a microporous layer.
Figure 9:
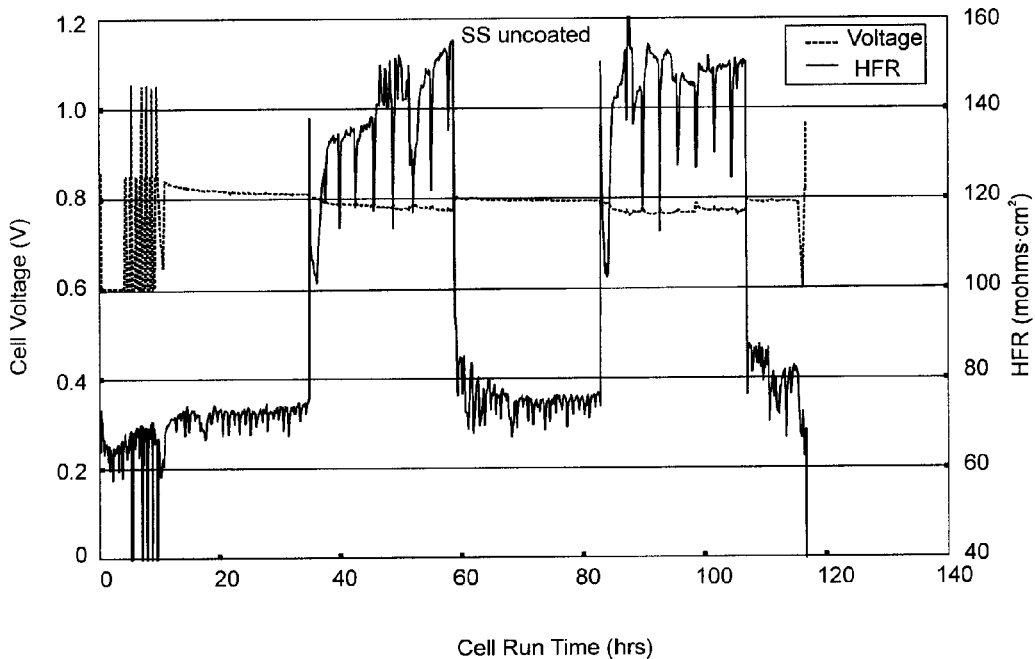
FIG. 9 provides plots of fuel cell voltage and high frequency resistance as a function of time for roughened stainless steel coupons contacting a gas diffusion layer having a microporous layer.

Table 2 provides contact resistance for roughed stainless steel coupons contacted to a gas diffusion layer having a microporous layer. In one series, the contact resistance is measured with the microporous layer not facing the roughened surface. This is the typical arrangement used in fuel cells. In another series of measurements, the contact resistance is measured with the microporous layer facing and contacting the roughened surface. At each compression pressure measured, the contact resistance is lowered when the microporous layer contacts the roughened surface. FIG. 8 provides fuel cell voltage and high frequency resistance versus current density for the roughened stainless steel coupons contacting a gas diffusion layer. The configuration having the microporous layer contacting the roughened surface is observed to have one third of the cell resistance observed with the regular gas diffusion medium in contact with the stainless steel surface. For example, at a cell voltage of 0.6 V a current density of 1.5 A cm-2 was obtained when the microporous layer was in contact with the roughened stainless steel surface. This is to be compared to a current density of 1 A cm-2 when using a regular gas diffusion medium in contact with the plate. The current configuration with the microporous layer in contact with the roughened plate surface is not prone to flooding as demonstrated by the data in FIG. 9. This figure shows that cycling the relative humidity in between 40 and 100% did not cause any drop in performance and thereby did not cuase any cell flooding.

Table 2 values of the contact resistance obtained on roughened stainless steel with and without the microporous layer facing the roughened surface

| Compression pressure, psi | MPL facing the roughened surface | MPL not facing the roughened surface |
|---|---|---|
| 25 | 113 | 291 |
| 50 | 59 | 133 |
| 100 | 28 | 69 |
| 150 | 15.9 | 50 |
| 200 | 10.5 | 40 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A metallic bipolar plate for use in a fuel cell having an anode diffusion layer, an anode, a cathode, and a cathode diffusion layer, the metallic bipolar plate comprising:
a metal plate having a first and second surface, at least one of the first and second surfaces defining one or more channels and a contact surface, the contact surface having a surface roughness defined by a plurality of peaks and valleys wherein at least a portion of the valleys are filled with an electrically conductive material consisting of electrically conductive particles, wherein the contact surface is adapted to contact the anode diffusion layer or the cathode diffusion layer.

2. The metallic bipolar plate of claim 1 wherein the conductive material comprises carbon.

3. The metallic bipolar plate of claim 2 wherein the conductive material is provided from a microporous layer contacting the contacting surface.

4. The metallic bipolar plate of claim 2 wherein the conductive particles are graphite particles.

5. The metallic bipolar plate of claim 1 having a surface roughness average from about 0.25 microns to about 0.5 microns.

6. The metallic bipolar plate of claim 1 wherein the conductive particles are present in an amount of 0.01 mg/cm$^2$ to 0.4 mg/cm$^2$.

7. The metallic bipolar plate of claim 1 wherein the metal plate comprises a metal selected from the group consisting of stainless steels, nickel-based alloys, titanium, nickel, and combinations thereof.

8. The metallic bipolar plate of claim 1 having a contact resistance less than about 50 mohm-cm$^2$ when contacted to a gas diffusion layer with a compression pressure of 200 psi.

9. The metallic bipolar plate of claim 1 having a contact resistance from about 10 mohm cm$^2$ to 100 mohm cm$^2$ when contacted to a gas diffusion layer with a compression pressure of 200 psi.

10. A fuel cell comprising:
a first bipolar plate;
an anode diffusion layer contacting the first bipolar plate at a first contacting interface;
an anode layer;
a ion conductor layer;
a cathode layer;
a cathode diffusion layer; and
a second bipolar plate contacting the cathode diffusion layer at a second contacting interface, wherein one or both of the first and second bipolar plates comprise a metal plate having a first and second surface such that at least one of the first and second surfaces define one or more channels and a roughened contact surface, the roughened contact surface having a surface roughness defined by a plurality of peaks and valleys wherein at least a portion of the valleys are filled with an electrically conductive material consisting of electrically conductive particles.

11. The fuel cell of claim 10 wherein the first contacting interface is characterized by a contact resistance that is less than about 300 mohm-cm$^2$ when contacted to a gas diffusion layer with a compression pressure of 200 psi.

12. The fuel cell of claim 10 wherein the first contacting interface is characterized by a contact resistance from about 10 mohm-cm$^2$ to 100 mohm-cm$^2$ when contacted to a gas diffusion layer with a compression pressure of 200 psi.

13. The fuel cell of claim 10 wherein the conductive material comprises carbon.

14. The fuel cell of claim 13 wherein the conductive material is provided from a microporous layer contacting the contacting surface.

15. The fuel cell of claim 13 wherein the conductive particles are graphite particles.

16. The fuel cell of claim 1 having a surface roughness average from about 0.25 microns to about 0.5 microns.

17. The fuel cell of claim 10 wherein the conductive particles are present in an amount from 0.01 mg/cm$^2$ to 0.4 mg/cm$^2$.

18. The fuel cell of claim 10 wherein the metal plate comprises a metal selected from the group consisting of stainless steels, nickel-based alloys, titanium, nickel, and combinations thereof.

19. A metallic bipolar plate for use in a fuel cell having an anode diffusion layer, an anode, a cathode, and a cathode diffusion layer, the metallic bipolar plate comprising:
a metal plate having a first and second surface, at least one of the first and second surfaces defining one or more channels and a contact surface, the contact surface having a surface roughness defined by a plurality of peaks and valleys wherein at least a portion of the valleys are filled with electrically conductive particles; and
a diffusion layer having a microporous layer, the microporous layer contacting the contact surface of the metal plate.

* * * * *